(12) United States Patent
Winter et al.

(10) Patent No.: US 9,052,380 B2
(45) Date of Patent: Jun. 9, 2015

(54) SYSTEM FOR DOPPLER POSITIONING OF SEISMIC SENSORS AND METHOD

(75) Inventors: Olivier Winter, Massy (FR); Thomas Bianchi, Massy (FR)

(73) Assignee: Seabed Geosolutions AG, Laksevag (NO)

( * ) Notice: Subject to any disclaimer, the term of this patent is extended or adjusted under 35 U.S.C. 154(b) by 523 days.

(21) Appl. No.: 13/475,169

(22) Filed: May 18, 2012

(65) Prior Publication Data

US 2012/0300582 A1    Nov. 29, 2012

(30) Foreign Application Priority Data

May 26, 2011   (FR) ...................................... 11 54609

(51) Int. Cl.
| | |
|---|---|
| *G01S 5/18* | (2006.01) |
| *G01S 3/802* | (2006.01) |
| *G01S 11/14* | (2006.01) |
| *G01S 13/50* | (2006.01) |
| *G01V 1/38* | (2006.01) |

(52) U.S. Cl.
CPC .................. *G01S 5/18* (2013.01); *G01S 3/8022* (2013.01); *G01S 11/14* (2013.01); *G01S 13/505* (2013.01); *G01V 1/3835* (2013.01)

(58) Field of Classification Search
CPC ..................................................... G01V 1/3835
USPC ....................................................... 367/19, 16
See application file for complete search history.

(56) References Cited

U.S. PATENT DOCUMENTS

| | | | |
|---|---|---|---|
| 3,827,022 A | | 7/1974 | Booth |
| 4,635,236 A | * | 1/1987 | Roberts ........................... 367/19 |
| 4,641,287 A | | 2/1987 | Neeley |
| 4,845,686 A | * | 7/1989 | Brac ............................. 367/130 |
| 4,951,263 A | * | 8/1990 | Shope ............................. 367/2 |
| 5,166,905 A | * | 11/1992 | Currie ............................ 367/19 |
| 5,668,775 A | * | 9/1997 | Hatteland ....................... 367/19 |
| 6,005,828 A | | 12/1999 | Carroll et al. |
| 2006/0076183 A1 | | 4/2006 | Duren |

FOREIGN PATENT DOCUMENTS

| | | |
|---|---|---|
| GB | 2 396 014 A | 6/2004 |
| WO | 03/001233 A1 | 1/2003 |

OTHER PUBLICATIONS

Australian Patent Examination Report issued in related Patent Application No. 2012202826 and issued May 27, 2013 (References cited in this Examination Report previously cited in an IDS filed May 18, 2012).
European Search Report issued in related EP 2 527 875 A1 with date of completion of search being Jun. 21, 2012 (All references cited in the Search Report were previously cited in an IDS filed May 18, 2012).
French Search Report issued in related FR Application No. 1154609 and issued on Jan. 26, 2012.

* cited by examiner

*Primary Examiner* — Mark Hellner (57) ABSTRACT

Method and system for determining positions of underwater sensors. The method includes sending a Doppler variant signal from a moving source; recording the signal with the at least one seismic sensor; evaluating a frequency drift of the recorded signal; and determining a position of the at least one seismic sensor based on the evaluated frequency drift and a source movement relative to the at least one sensor.

19 Claims, 11 Drawing Sheets

SYSTEM FOR DOPPLER POSITIONING OF SEISMIC SENSORS AND METHOD

BACKGROUND

1. Technical Field

Embodiments of the subject matter disclosed herein generally relate to methods and systems and, more particularly, to mechanisms and techniques for determining positions of underwater objects.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those undertaking the offshore drilling need to know where to drill in order to avoid a dry well.

Marine seismic data acquisition and processing generate a profile (image) of the geophysical structure under the seafloor. While this profile does not provide an accurate location for the oil and gas, it suggests, to those trained in the field, the presence or absence of oil and/or gas. Thus, providing a high resolution image of the structures under the seafloor is an ongoing process that requires the deployment of many seismic sensors and the recording of various seismic waves.

Figure 1:
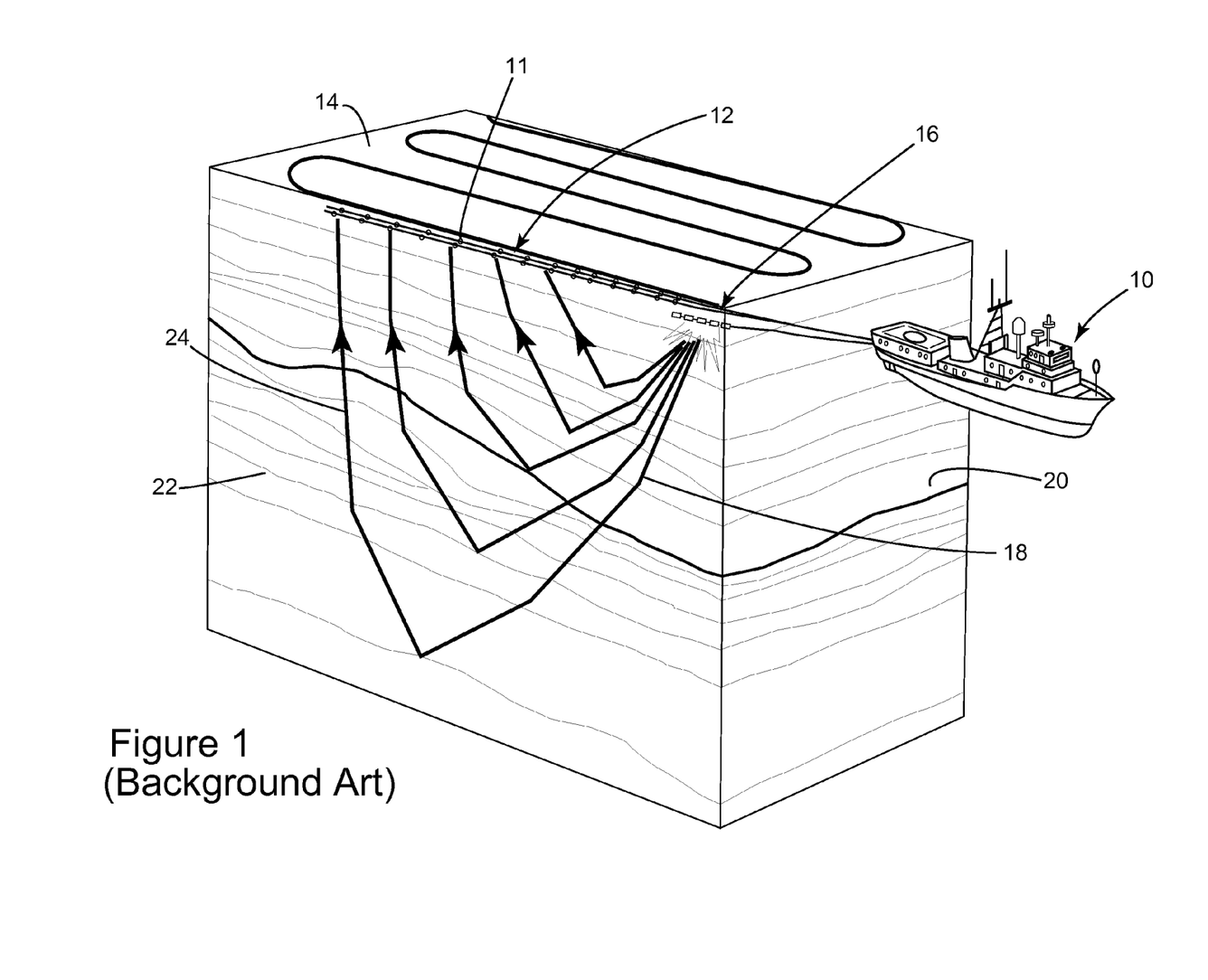
FIG. 1 is a schematic diagram of a conventional system for detecting the positions of towed sensors.

One method for recording the seismic waves is now discussed with regard to FIG. 1. This method is appropriate when a distance from the surface of the water to the bottom of the water is large, for example, larger than 200 m. During a seismic gathering process, a vessel 10 drags an array of seismic detectors 11 provided on streamers 12. The streamers may be disposed horizontally, i.e., lying at a constant depth relative to a surface 14 of the ocean. The streamers may be disposed to have other spatial arrangements than horizontally. The vessel 10 also drags a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by a detector 11 on the streamer 12.

However, the reflected seismic wave 24 (primary) is not only recorded by the various detectors 11 (the recorded signals are called traces) but also may reflect from the water surface 14 as the water surface acts as a mirror for the sound waves, e.g., reflectivity one. The waves reflected by the water surface are called ghosts in the art and these waves are reflected back towards the detector 11. The ghosts are also recorded by the detector 11 but with a reverse polarity and a time lag relative to the primary.

As discussed above, the recorded traces may be used to determine the structure of the sub-structure (i.e., earth structure below surface 20) and to determine the position and presence of reflectors 22. However, to be able to determine the position of reflectors 22, an accurate position of the detectors 11 is necessary.

Figure 2:
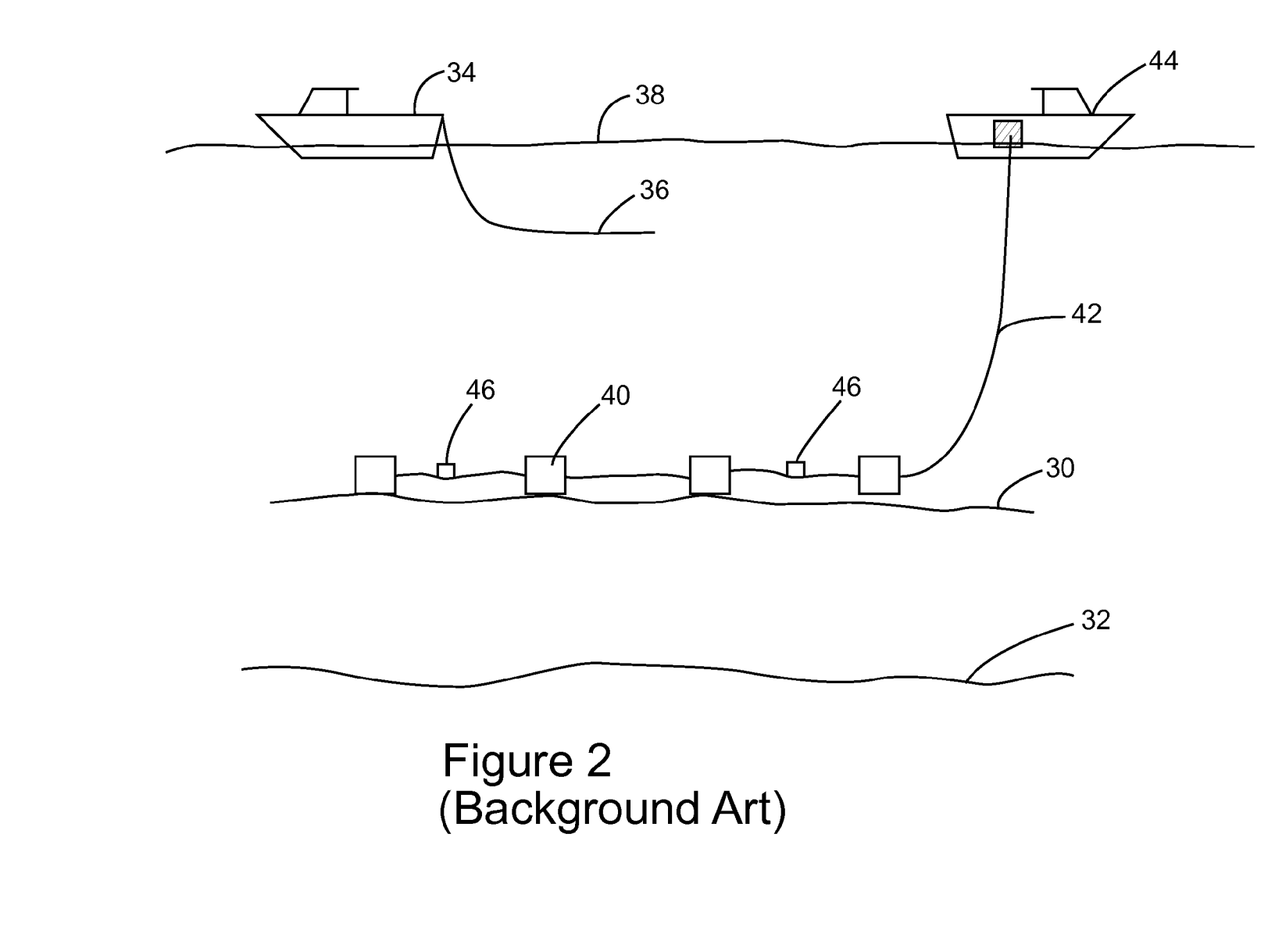
FIG. 2 is a schematic diagram of a convention system for detecting positions of ocean bottom sensors.

Another method for recording seismic waves uses fixed sensors placed on the bottom of the region to be investigated as shown in FIG. 2. This method is appropriate for shallow waters, when the distance from the surface of the water to the bottom of the water is 200 m or less. FIG. 2 shows the bottom 30 of the water and a reflector 32 in the subsurface. A first vessel 34 tows a seismic source 36 with the seismic source 36 being provided below the surface 38 of the water. Detectors 40 are provided on the bottom 30 of the water. The detectors 40 are connected via cables 42 to a recording vessel 44. This technology is called ocean bottom cable (OBC). Ocean Bottom Seismometers may also be used for recording seismic waves. The Ocean Bottom Seismometer is a self contained data-acquisition system which free falls to the ocean floor and records seismic data generated by airguns and earthquakes. Similar to the method shown in FIG. 1, the positions of the detectors 40 need to be known in order to determine the position of the reflector 32.

For determining the positions of the sensors for OBC, the following techniques are common in the industry: (1) using the drop or placement coordinates of the detectors, and (2) deploying high-frequency acoustic sensors attached to the detectors and positioned independently of the seismic survey and determining the positions of the detectors based on the high-frequency acoustic sensors. The positions of the sensors may be inferred by using the first seismic source arrivals.

Because drop positions in the first technique must be recorded to assure that the actual detector locations are near the planned locations, drop positions are the cheapest and easiest to implement. In calm shallow water (such as an inland bay where the detectors may be placed on or thrust into the muddy bottom), the detector drop position can be close to the resting position. However, in deeper water or in agitated surf zones, this is unlikely due to waves, currents and drop trajectories.

The second technique, which is disclosed in U.S. Pat. No. 4,641,287, the entire disclosure of which is incorporated herein by reference, uses acoustic transponders located on a seismic cable that connect the sensors. FIG. 2 shows acoustic transponders 46 placed at various positions. The acoustic transponders are interrogated by a dedicated source boat (not shown). The acoustic pulse's frequency emitted by the dedicated source boat is in the 30 kHz to 100 kHz range, i.e., a high frequency range. Repeating the interrogation at different known locations allows the operator of the boat to triangulate and deduce the precise pinger position of the sensors 40.

However, there are not as many acoustic transponders as seismic sensors. Furthermore, the acoustic transponders are located on the cable, in-between the seismic sensors. Thus, the positions of the sensors are interpolated from acoustic pingers positions, which give approximate results.

A system described in U.S. Pat. No. 6,005,828, the entire disclosure of which is incorporated herein by reference, couples the acoustic transponders with the seismic sensors, which improves the localization of the sensors.

However, the existing technologies are not capable to exactly determine the positions of the sensors and also require the presence of acoustic transponders, which make the entire equipment complex and prone to failures. Further, if less transponders than sensors are used, the accuracy cannot be improved over a certain threshold. If each sensor is provided with a transponder, the complexity and the weight of the system increases. Accordingly, it would be desirable to provide systems and methods that provide an accurate positions of the sensors without the acoustic transponders.

SUMMARY

According to one exemplary embodiment, there is a method for determining a position of at least one seismic sensor when deployed underwater. The method includes a step of sending a first mono-frequency signal from a moving source; a step of recording the first signal with the at least one seismic sensor; a step of evaluating a frequency drift of the recorded first signal; and a step of determining a position of the at least one seismic sensor based on the evaluated frequency drift and a source movement relative to the at least one seismic sensor.

According to still another exemplary embodiment, there is a method for determining a position of at least one seismic sensor when deployed underwater. The method includes a step of emitting a Doppler variant signal from a moving source; a step of recording pressures, particle velocities or particle accelerations and associated times with the at least one seismic sensor fixedly attached to the bottom of the ocean, wherein the pressures, particle velocities or particle accelerations contain the emitted Doppler variant signal modulated by the Doppler effect; a step of measuring a frequency drift from the recorded pressures, particle velocities or particle accelerations; and a step of determining a position of the at least one seismic sensor based on the measured frequency drift and a source movement relative to the at least one seismic sensor. The Doppler variant signal is one of a sine wave, a triangular wave, a rectangular wave or a combination thereof.

According to still another exemplary embodiment, there is a system for determining a position of at least one seismic sensor when deployed underwater. The system includes a moving source configured to send a Doppler variant signal having a first frequency; the at least one sensor configured to record pressures, particle velocities or particle accelerations and associated times, wherein the pressures, particle velocities or particle accelerations contain the Doppler variant signal modulated by Doppler effect; and a control device. The control device is configured to receive data from the source and from the at least one sensor to calculate a frequency drift from the recorded pressures, particle velocities or particle accelerations, and to determine a position of the at least one seismic sensor based on the calculated frequency drift and a source movement relative to the at least one sensor. The Doppler variant signal is one of a sine wave, a triangular wave, a rectangular wave or a combination thereof.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a set of sensors being deployed on the bottom of the ocean. However, the embodiments to be discussed next are not limited to these sets, but may be applied to sensors being towed by a vessel or other devices whose positions underwater need to be accurately determined.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
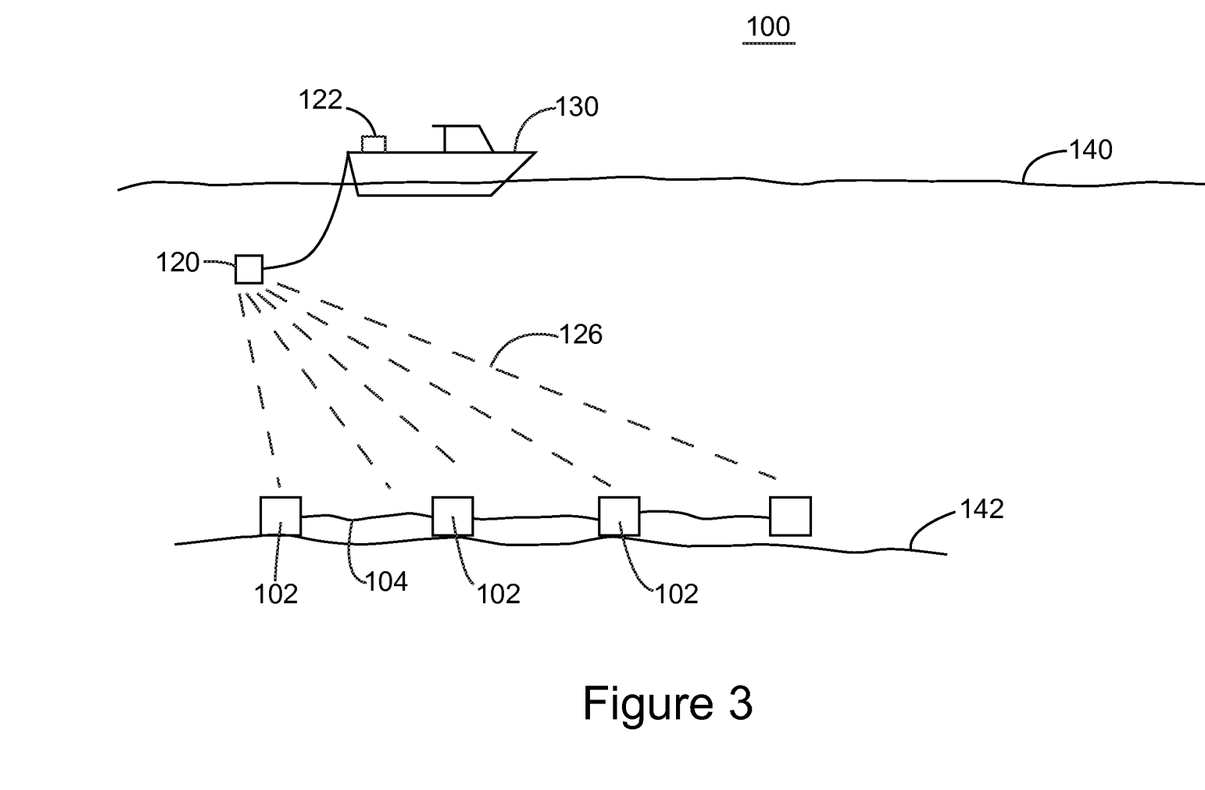
FIG. 3 is a schematic diagram of a system for detecting positions of sensors according to an exemplary embodiment.

The technologies in marine seismic surveys need accurate positions of the sensors deployed underwater. One novel approach for determining the positions of the sensors deployed underwater is illustrated with reference to FIG. 3. FIG. 3 shows a system 100 that include plural sensors 102 provided on the bottom 142 of the ocean. Although the term "ocean" is used herein, one skilled in the art would understand that this term also refers to a lake, pond, sea, or other body of water. No acoustic transducers are provided along cables 104 connecting the sensors 102 or on the sensors 102 for determining their positions. Instead, the sensors 102 themselves are used for determining their position as generically described now. A source 120 is towed by a vessel 130. A control system 122, disposed either on the vessel 130 or on the source 120, is configured to drive the source 120 with a frequency that can be recorded by the sensors 102. Waves 126 having one or more frequencies are emitted by the source 120. A Doppler shifted frequency is recorded by the sensors 102, as will be discussed later. The Doppler shifted frequency and/or a frequency drift are used in the following for determining the positions of the sensors. The Doppler shifted frequency is a combination (addition, subtraction or ratio) of the emitted frequency and the frequency drift. In other words, the frequency drift is the absolute difference between or the ratio of the emitted frequency and the Doppler shifted frequency. Based on the Doppler shifted frequency and some characteristics of the medium (e.g., speed of sound in the water between the source 120 and the sensor 102), accurate positions of the sensors 102 may be determined. Details of these processes are now discussed with regard to the figures.

Figure 4:
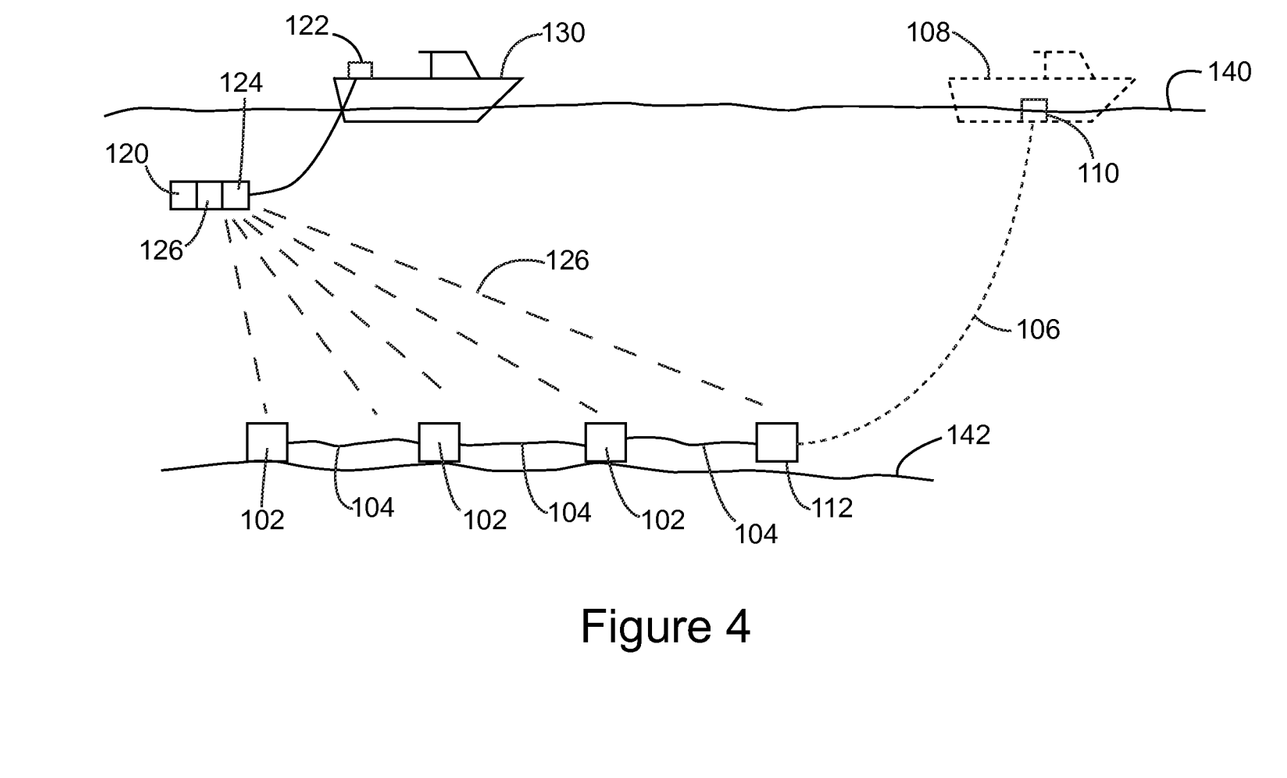
FIG. 4 is a schematic diagram of a system that uses Doppler variant signals for determining sensors according to an exemplary embodiment.

According to an exemplary embodiment, FIG. 4 shows that the sensors 102 may communicate through data cables 106 with a master vessel 108. A control device (controller) 110 provided on the vessel 108 may supply the necessary computing power for determining the positions of the sensors. Alternatively, in node acquisition, i.e., if the data cable 106 is not present, the readings from the sensors 104 may be collected on a recorder 112 attached to the sensor and then later retrieved by an autonomous vehicle (not shown). The retrieved data may be provided to the control device 110 or 122 for processing.

The position determining system 100 includes the seismic 120 that is controlled by the controller 122. The controller 122 may be provided on the vessel 130 or directly on the source 120. The source 120 may be an acoustic source. A frequency range to be used by the acoustic source may be less than 1.2 kHz. In this regard, it is noted that the conventional methods use a high frequency source, having a frequency range between 30 kHz and 100 kHz. Thus, the acoustic source of this novel embodiment has a frequency much lower than the sources used by the existing technologies. This frequency difference creates the possibility to record the frequencies of the acoustic source directly with the sensors 102. As the frequency spectrum of interest from a seismic point of view is likely to be between 1 and 300 Hz, one skilled in the art would appreciate that a frequency emitted by the conventional positioning methods cannot be recorded by the sensors 102 as this frequency is too high for these sensors. Typical recording systems uses in the seismic field are designed to record frequencies not larger than 2 kHz. In one application, the source can have a higher frequency, for example, an acoustic frequency (1 kHz to 20 kHz).

Because the vessel 130 moves around the expected positions of the sensors 102, the moving source 120 emits a Doppler variant signal in the sensor's bandwidth. In one application, the vessel 130 moves with a constant speed, around 5 knots per hour. A global positioning system (GPS) unit 124 may be located next to the source 120 (e.g., on the source or on the vessel) for locating the exact position of the source 120 when emitting the Doppler variant signal. A Doppler variant signal is defined, for example, as a band-limited signal. The opposite of a band-limited signal is a broadband signal. The ideal broadband signal is a Dirac signal, i.e., an impulse signal.

Examples of Doppler variant signals are a sine-wave, a triangular-wave, a square-wave or a combination of these signals at different frequencies. Those skilled in the art can imagine other Doppler variant signals. For example, a combination of different sinusoids may be used as long as their frequencies are sufficiently spaced apart (this is a function of the boat speed) so that the sensors 102 can distinguish them. Also, interrupted band-limited signals may be used.

Returning to the source 120, a wave 126 emitted by the source propagates in all directions under water. FIG. 4 shows only the waves 126 of interest. For simplicity, in the following it is assumed that the wave 126 emitted by the source 120 has a single frequency $F_{source}$. However, one skilled in the art would easily be able to extend to following method to waves having multiple frequencies.

As the wave 126 propagates from the vessel 130 to the sensor 102 through the medium (e.g., sea-water) and as the vessel 130 moves with a certain radial velocity relative to the sensor 102, a frequency recorded by the sensor is different from the frequency emitted by the source. This deviation (shift) can be calculated using formula:

$$\frac{F_{source}}{F_{obs}} = 1 - \frac{V_{radial}}{V_{water}},$$

where $F_{source}$ is the frequency of the wave when emitted at the source, $F_{obs}$ is the frequency of the wave when recorded at sensor 102, $V_{radial}$ is the radial velocity of the vessel 130 relative to the sensors 102 and $v_{water}$ is the speed of sound in the water.

Figure 5:
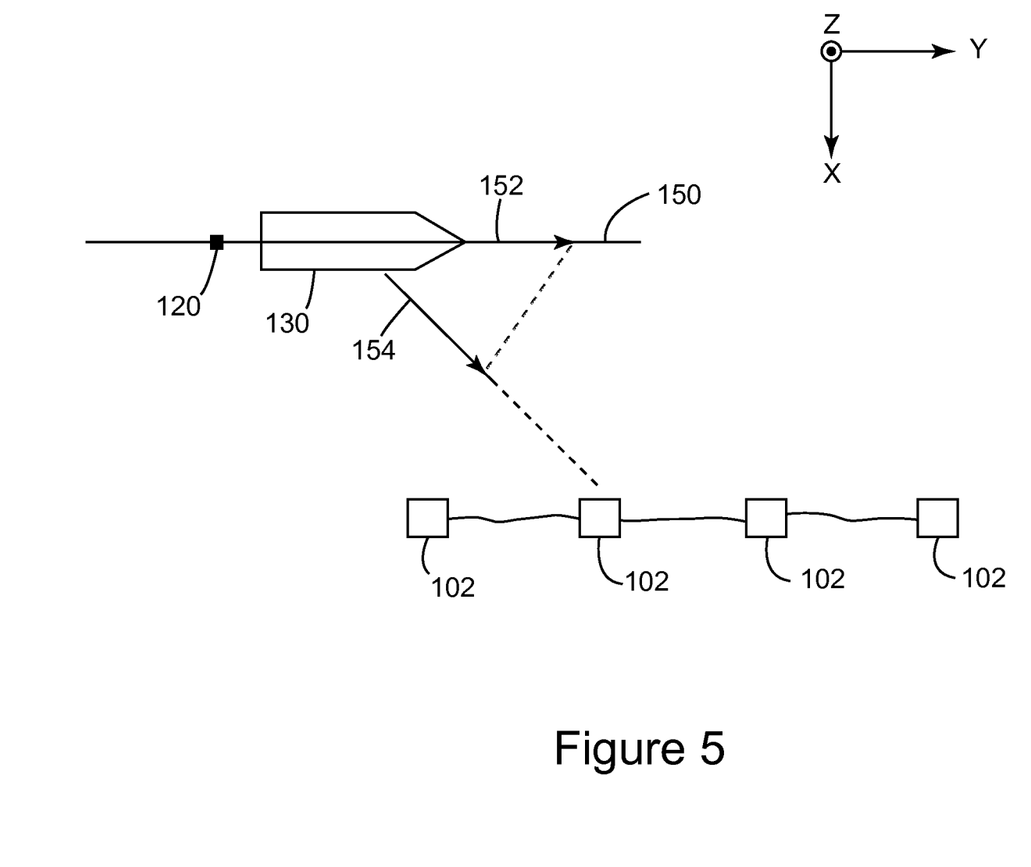
FIG. 5 is a schematic diagram showing a radial velocity on a map.

FIG. 5 is a map showing a top view (in the X and Z coordinates) of the source 120, vessel 130 and sensors 102. FIG. 5 also shows a sail line 150 of the vessel 130, its actual velocity 152, and its radial velocity 154. The radial velocity 154 is the projection of the actual velocity 152 along a line that connects the source 120 to a sensor 102. For example, the radial velocity may be determined, in Cartesian coordinates, based on the relation $$V_{radial} = \frac{\sqrt{(X_2 - x)^2 + (Y_2 - y)^2 + (Z_2 - z)^2} - \sqrt{(X_1 - x)^2 + (Y_1 - y)^2 + (Z_1 - z)^2}}{t_2 - t_1},$$

where x, y and z represent the position of the recording sensor 102, $X_1, Y_1$, and $Z_1$ represent the position of the source at $t_1$ and $X_2, Y_2$ and $Z_2$ represent the position of the source at $t_2$. A time difference between $t_1$ and $t_2$ is assumed to be small for the above relation to be precise enough for the purpose of this exemplary embodiment. The speed of sound in water may be measured or determined and the $F_{source}$ is controlled by the controller 122.

Thus, the $F_{obs}$ may be mathematically determined (assuming that the positions x and y of the sensors are known) and at the same time the $F_{obs}$ is available from the recordings of the sensors 102. Mathematical algorithms may be used to solve this inversion problem, i.e., vary the positions x, y of the sensors 102 until a good match is obtained between $F_{obs}$ measured and $F_{obs}$ calculated. In order to achieve these results, as already discussed, the accurate positions of the source as it passes the sensors and corresponding time stamps need to be known. In addition, the recordings of the sensors need to be time stamped for a good correlation with the source.

Figure 6:
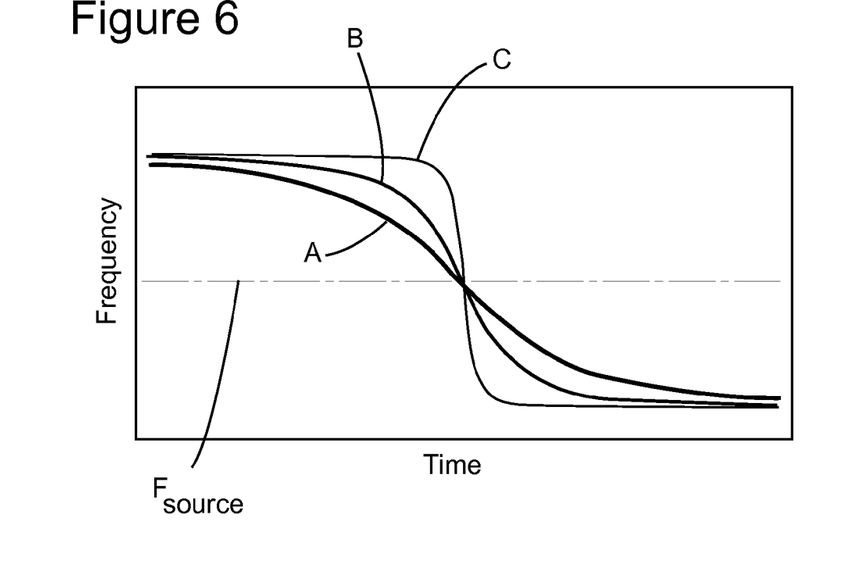
FIG. 6 is a graph showing recorded frequencies as a vessel moves around the sensors according to an exemplary embodiment.
Figure 7:
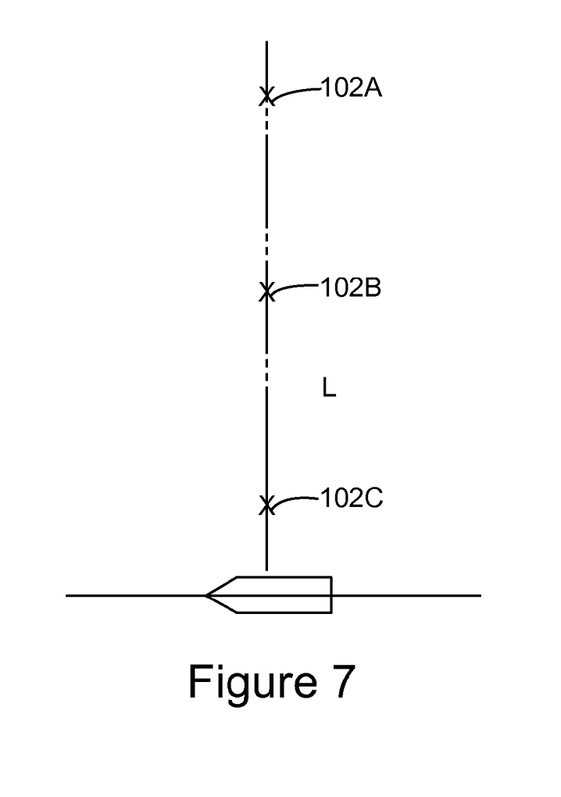
FIG. 7 is a schematic diagram of a geometry of the vessel relative to the sensors.

The shape of the recorded $F_{obs}$ at three sensors 102A to C is shown in FIG. 6. The geometry of the three sensors 102A to C are shown in FIG. 7 relative to the passing vessel 130. FIG. 6 shows the emitted frequency $F_{source}$ in time and the time variation (Doppler drift) of the recorded frequencies at the sensors as the vessel 130 moves relative to the sensors. It is noted that when the vessel 130 passes a line L connecting the three sensors, the frequencies recorded by the sensors are equal to the emitted frequency as $v_{radial}$ is zero.

Figure 8:
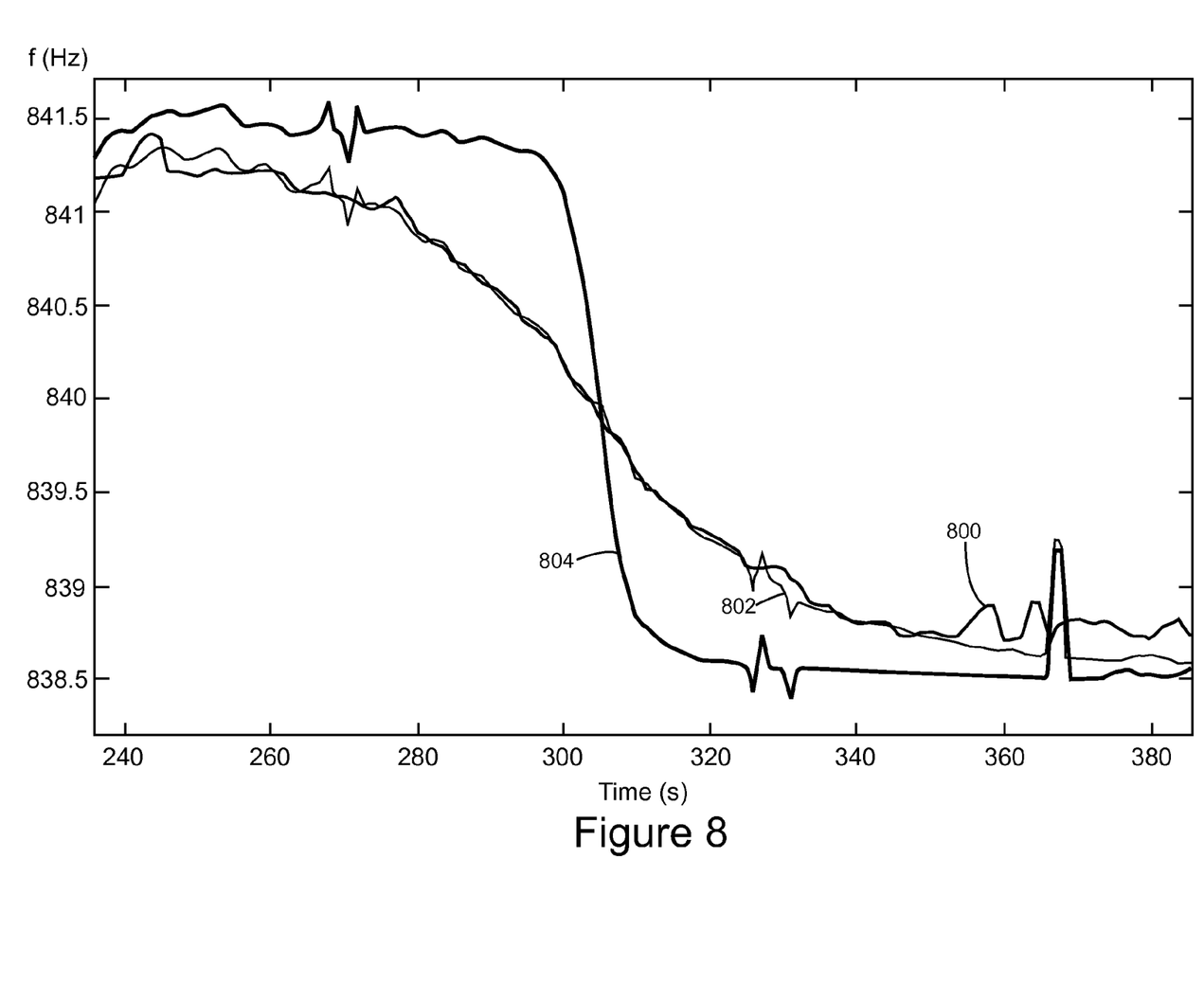
FIG. 8 is a graph illustrating frequencies versus time according to an exemplary embodiment.

According to an exemplary embodiment, FIG. 8 is a plot of frequency versus time that shows a curve 800 that corresponds to the measured frequency determined by a sensor 102, a curve 802 that shows the modeled frequency with a priori sensor location and a curve 804 that shows the modeled frequency with wrong sensor location. The sensor location is the location estimated by the operator of the vessel when deploying the sensors, which might be different from the actual location of the sensors. It is noted the close correlation between the measured curve 800 and the modeled curve 802 with a prior sensor location.

Figure 9:
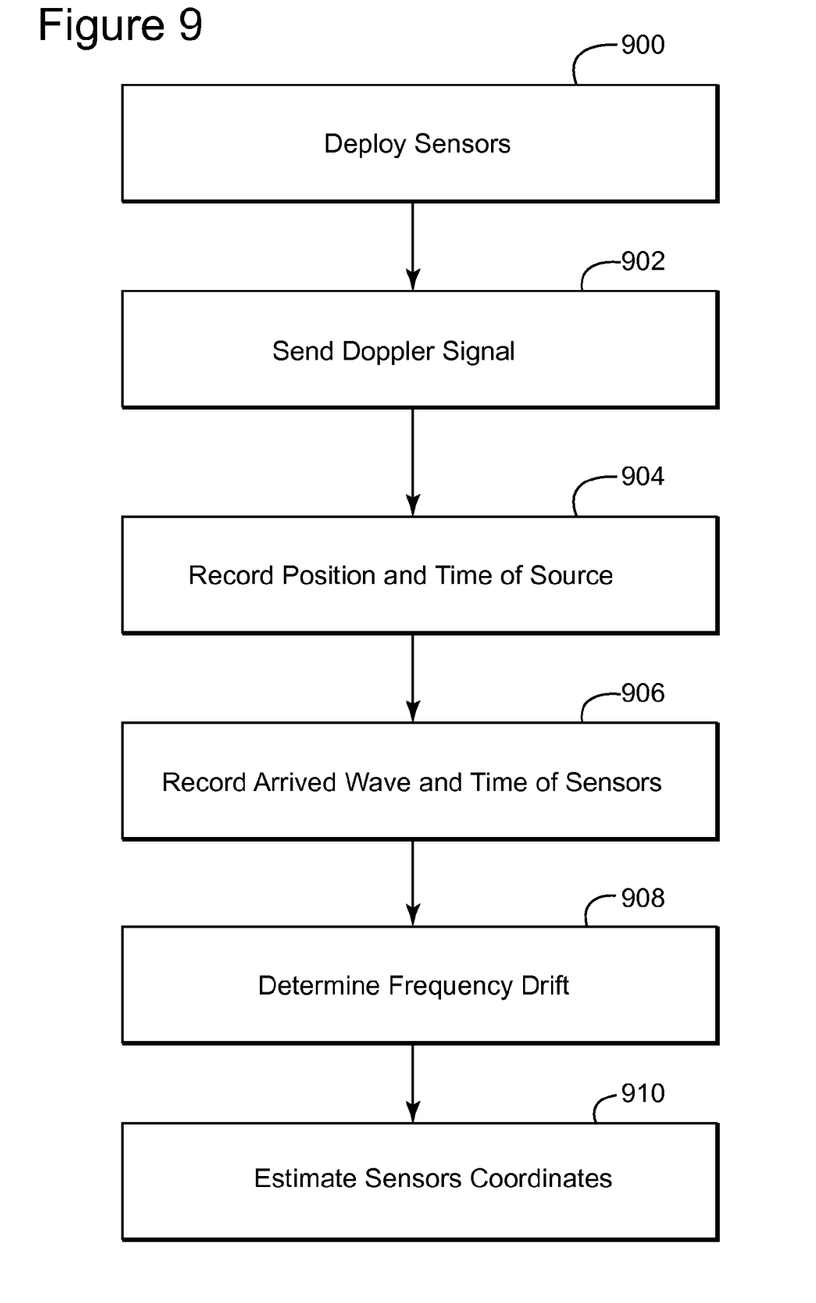
FIG. 9 is a flowchart illustrating a method for determining positions of sensors according to an exemplary embodiment.

According to another exemplary embodiment, a process for determining the positions of the sensors is now discussed with regard to FIG. 9. As this process is intended to be as complete as possible, it is noted that not all the steps need to be performed for determining the positions of the sensors. In other words, some steps to be described next are optional. As shown in FIG. 9, in step 900 the sensors 102 are deployed at the bottom of the ocean and their dropping coordinates are recorded. This information constitutes the a priori sensor location discussed above with regard to FIG. 8. However, this information is not accurate as the sensor can move from the desired position due to various factors, e.g., ocean currents.

In step 902, the vessel 130 moves around the sensors following various lines of sail while sending Doppler variant signals. The acoustic source used to generate the Doppler variant signal may be a source commercially available. In one application, multiple sources are used for generating multiple frequencies. In another application, the engine of the vessel 130 may be used as the acoustic source as this engine generates acoustic waves. A sufficient source-sensor angle aperture is preferred for determining an accurate position. The angle aperture is defined, with regard to FIG. 5, as the angle between the actual velocity 152 and the radial velocity 154. A sufficient angle aperture would be at least 70 to 90° wide. In one application, the source emits a continuous wave and the sensors continuously record the arriving waves. However, the process can work even if the source does not continuously emit the wave and/or the sensors do not continuously record the waves.

In step 904, the source coordinates over time are recorded, for example, using industrial GPS systems such as Differential Global Positioning Systems (DGPS) or Real Time Kinematic (RTK). In step 906, the sensors recordings are time stamped and recorded to relate them to the source GPS positions. For the sensors, it is noted that various types of sensors may be used for determining the drifted frequency. For example, geophones (speeds), hydrophones (pressures) or accelerometers (accelerations) may be used as sensors. The sensors may have the capability to determine themselves the drifted frequency or transmit the recorded data to a general controller for determining the drifted frequency.

The seismic sensors should record enough time to achieve the needed aperture. Continuous recording is preferred, but not necessary. The more redundancy, the more accurate the computed positions of the sensors. In step 908, using the recorded pressures or velocities or accelerations (depending on the type of sensor), the received frequencies are selected for given time windows, and the frequency drift is calculated relative to the emitted frequency, as a function of time. It is noted that working with band-limited signals allows to spread the energy over time, which is not the case with impulsive methods.

The frequency drift estimation can be performed in the recording device (some modifications of the recording device may be needed), or on the seismic trace in real-time, or on the seismic trace at post-processing. The two last possibilities take into account both autonomous underwater recording systems (nodes on which it is impossible to access sensor recordings in real-time) and conventional recording systems (i.e., a recorder provided on a master vessel and attached via a cable to the sensors). For example, with regard to FIG. 4, the data necessary for determining the positions of the sensors may be processed in the controller 110 or controller 122 or may be distributed for processing in both of these controllers.

An alternative to the frequency selection discussed above, is the use of a sensor 126 (near-field) provided next to the source 122, e.g., on the vessel 130 so that no Doppler shift is recorded for this moving sensor 126. The frequency drift may be estimated by comparing the recordings of the moving sensor 126 with the recordings of the static sensors 102.

In step 910, the sensors' absolute or relative coordinates are estimated via an inverse-problem approach, i.e., find the coordinates that best explain the measured frequencies over time. In this step one or more of the following information may be used: approximate sensors locations, source coordinates as a function of time, approximate sound velocity in the water, stream models, and/or a constraint on a well-known sensor position. Optionally, the method can attach weights to each of the frequencies measured in step 908 according to measurement uncertainties estimation.

In an optional step, uncertainties analysis for all estimated sensors positions is performed. Thus, the operator of the sensors may be provided not only with the estimated positions of the sensors but also with the uncertainties (accuracies) of those positions.

From an equipment point of view, it is noted that the novel method discussed above can be implemented for the exiting sensors 102 without any modifications as the existing sensors are capable of detecting frequencies in the range of 0 to 2 kHz. On the source side, commercially available sources may be used or even the hardware for the acoustic transponder pinging boats may be used if the emitting frequency is modified to be in the range of the sensor. These sources may be modified to include an amplifier and a precise waveform generator that has the capability to time-stamp the emitted waves.

Figure 10:
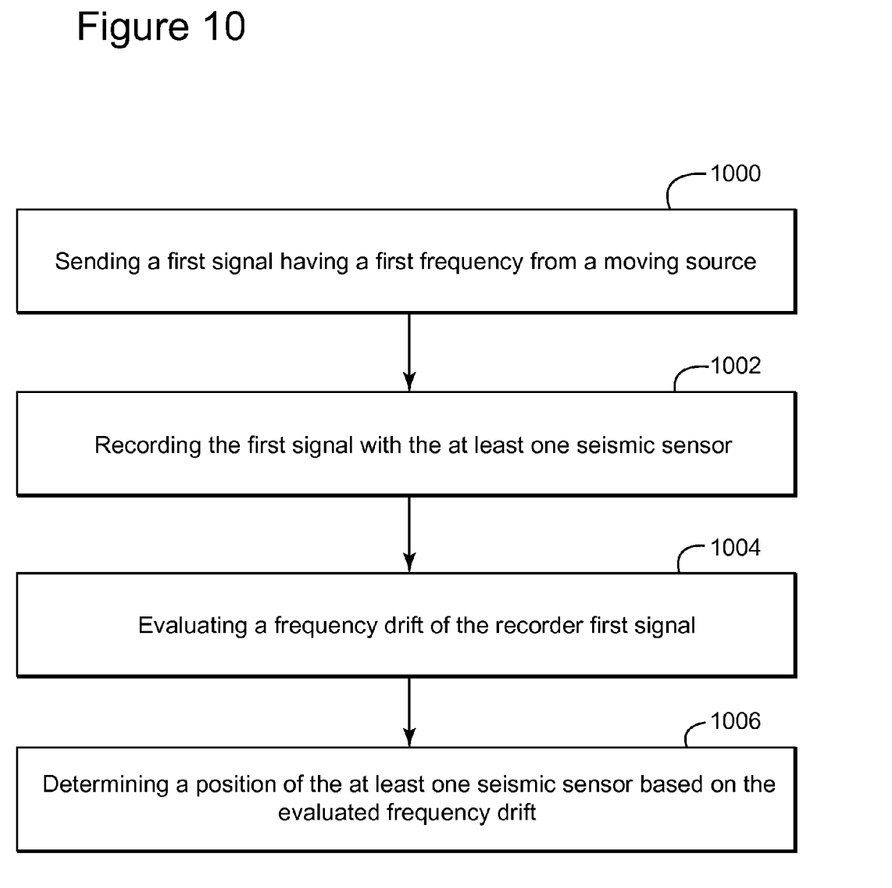
FIG. 10 is a flowchart illustrating another method for determining positions of sensors according to an exemplary embodiment.
Figure 11:
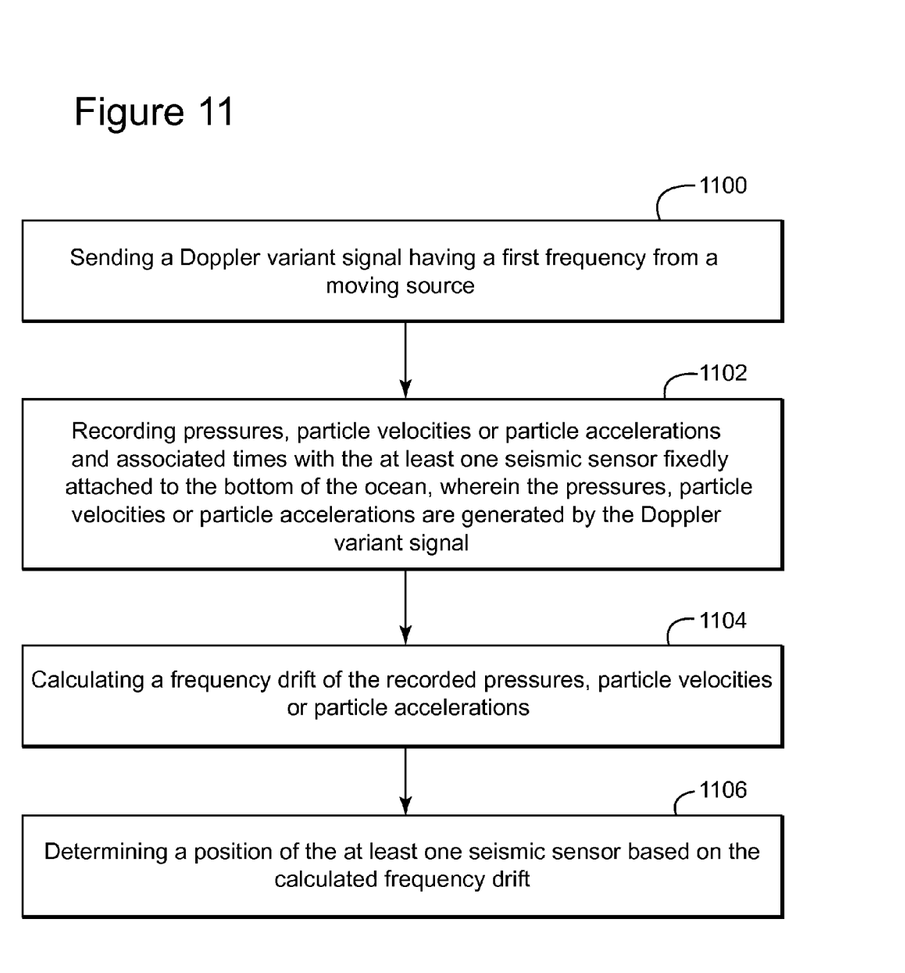
FIG. 11 is a flowchart illustrating still another method for determining positions of sensors according to an exemplary embodiment.

Various methods to be implemented for determining the positions of the sensors are now described with regard to FIGS. 10 and 11. In an exemplary embodiment illustrated in FIG. 10, there is a method for determining a position of at least one seismic sensor when deployed underwater. The method includes a step 1000 of sending a first signal having a first frequency from a moving source; a step 1002 of recording the first signal with the at least one seismic sensor; a step 1004 of evaluating a frequency drift of the recorded first signal; and a step 1006 of determining a position of the at least one seismic sensor based on the evaluated frequency drift.

According to another exemplary embodiment illustrated in FIG. 11, there is a method for determining a position of at least one seismic sensor when deployed underwater. The method includes a step 1100 of sending a Doppler variant signal having a first frequency from a moving source; a step 1102 of recording pressures, particle velocities or particle accelerations and associated times with the at least one seismic sensor fixedly attached to the bottom of the ocean, wherein the pressures, particle velocities or particle accelerations are generated by the Doppler variant signal; a step 1104 of calculating a frequency drift of the recorded pressures, particle velocities or particle accelerations; and a step 1106 of determining a position of the at least one seismic sensor based on the calculated frequency drift. As discussed above, these methods may be applied to sensors that fixed to the bottom of the ocean or to sensors that are towed by a master vessel.

Optionally, the method described above may include a step in which the measured frequency curve at the at least one seismic sensors is fitted to a measured frequency curve at an at least one seismic sensor of a known position, and/or a step of determining the position of the at least one sensor relative to the at least one sensor of known position by fitting respective measured frequency curves.

With regard to where the calculations of the sensors positions are performed, it is noted that these calculations may take place in a control device (e.g., a processor) that is configured to perform at least some of the steps discussed with regard to FIG. 9. More specifically, the control device may be one of the controllers 110, 122 or another controller or a combination of them. For example, in one application, data related to the source is collected by the controller 122 and data related to the sensors 102 is collected by controller 110. As will be described shortly, a controller may include not only a processor but also a storage device for storing data and other components.

The data from controller 122 may be transferred to the controller 110 and then the entire processing may take place at controller 110. Alternatively, data from controller 110 may be transferred to controller 122 and then the entire processing may take place at controller 122. Still another possibility is to transfer data from both controllers 110 and 122 to another controller (not shown, for example, a processing trailer or a processing centre after the completion of the acquisition campaign) that has more computing resources and then perform the entire processing at this controller. The communications between the controllers may take place via internet, radio waves, microwaves, satellite or other known means in the art. The connections between the controllers may be wired or wireless.

Figure 12:
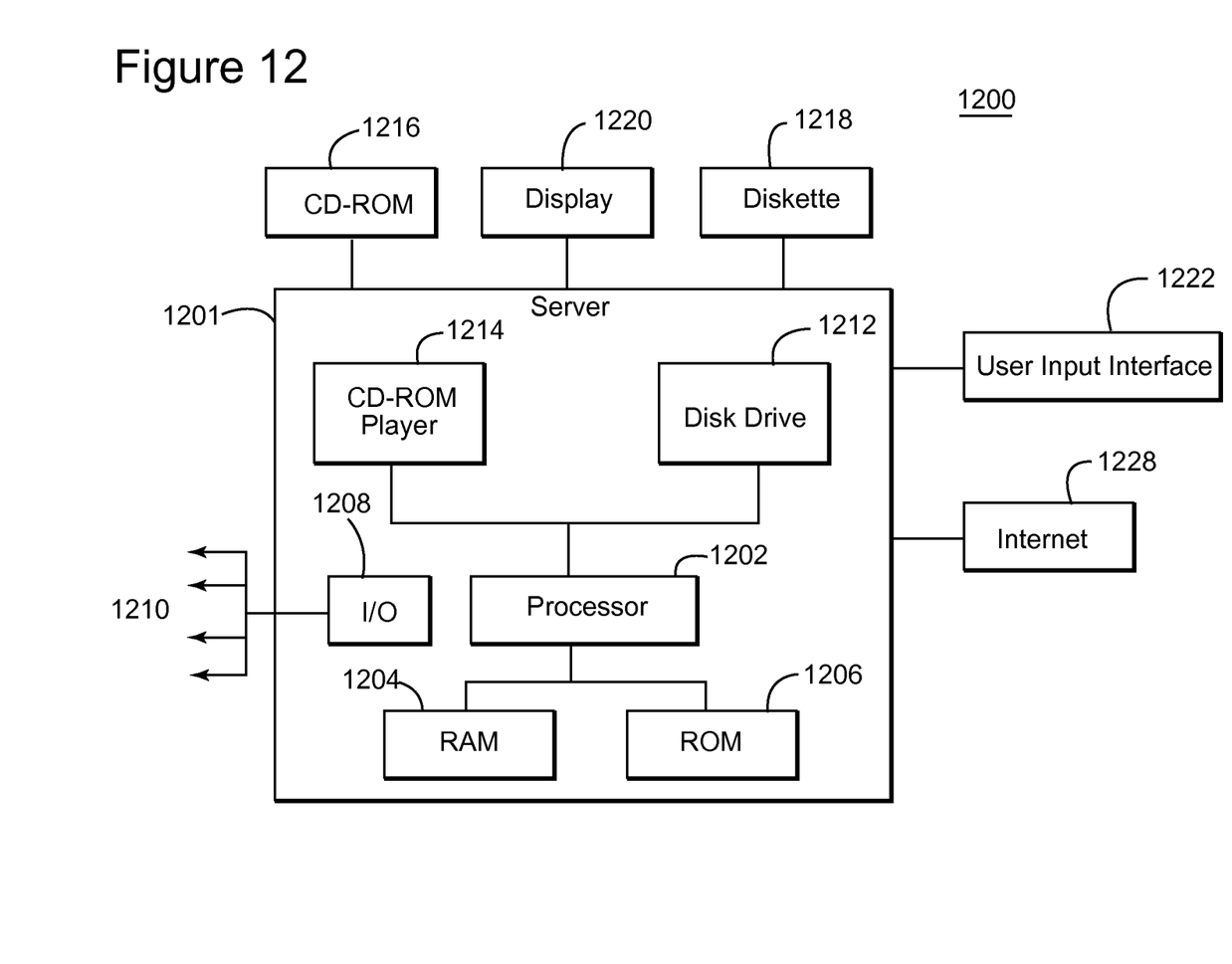
FIG. 12 is a schematic diagram of a control device configured to determine positions of sensors according to an exemplary embodiment.

An example of a representative control device or controller capable of carrying out operations in accordance with the exemplary embodiments discussed above is illustrated in FIG. 12. Hardware, firmware, software or a combination thereof may be used to perform the various steps and operations described herein. The control device 1200 of FIG. 12 is an exemplary computing structure that may be used in connection with such a system.

The exemplary control device 1200 suitable for performing the activities described in the exemplary embodiments may include a server 1201, which may correspond to any of controllers 110 or 122 shown in FIG. 4. Such a server 1201 may include a central processor (CPU) 1202 coupled to a random access memory (RAM) 1204 and to a read-only memory (ROM) 1206. The ROM 1206 may also be other types of storage media to store programs, such as programmable ROM (PROM), erasable PROM (EPROM), etc. The processor 1202 may communicate with other internal and external components through input/output (I/O) circuitry 1208 and bussing 1210, to provide control signals and the like. The processor 1202 carries out a variety of functions as is known in the art, as dictated by software and/or firmware instructions.

The server 1201 may also include one or more data storage devices, including hard and floppy disk drives 1212, CD-ROM drives 1214, and other hardware capable of reading and/or storing information such as DVD, etc. In one embodiment, software for carrying out the above discussed steps may be stored and distributed on a CD-ROM 1216, diskette 1218 or other form of media capable of portably storing information. These storage media may be inserted into, and read by, devices such as the CD-ROM drive 1214, the disk drive 1212, etc. The server 1201 may be coupled to a display 1220, which may be any type of known display or presentation screen, such as LCD displays, plasma display, cathode ray tubes (CRT), etc. A user input interface 1222 is provided, including one or more user interface mechanisms such as a mouse, keyboard, microphone, touch pad, touch screen, voice-recognition system, etc.

The server 1201 may be coupled to other computing devices, such as the landline and/or wireless terminals and associated applications, via a network. The server may be part of a larger network configuration as in a global area network (GAN) such as the Internet 1228, which allows ultimate connection to the various landline and/or mobile client devices.

In the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The disclosed exemplary embodiments provide a system and a method for determining the positions of various sensors underwater. It should be understood that this description is not intended to limit the invention. On the contrary, the exemplary embodiments are intended to cover alternatives, modifications and equivalents, which are included in the spirit and scope of the invention as defined by the appended claims.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining a position of at least one seismic sensor when deployed underwater, the method comprising:
   sending a first mono-frequency signal from a moving source;
   recording the first signal with the at least one seismic sensor;
   evaluating a frequency drift of the recorded first signal;
   determining a position of the at least one seismic sensor based on the evaluated frequency drift and a source movement relative to the at least one seismic sensor;
   repetitively sending the first signal from the source;
   recording locations of the source and associated times when repetitively emitting the first signal;
   determining a modeled frequency drift curve based on the first signal and its corresponding times, radial velocities of the source, and medium parameters; and
   determining a measured frequency drift curve from the recorded pressures, particle velocities or particle accelerations and their corresponding times.

2. The method of claim 1, wherein the first signal is a Doppler variant signal which has a band-limited spectrum.

3. The method of claim 1, further comprising:
   sending a second mono-frequency signal having a different frequency from the first signal; and
   determining the position of the at least one seismic sensor based on both the first and second signals.

4. The method of claim 1, further comprising:
   determining the position of the at least one sensor by best fitting the modeled frequency drift curve with the measured frequency drift.

5. The method of claim 4, wherein the measured frequency drift curve is estimated by comparing recordings of a sensor moving along with the source with recordings of the at least one seismic sensor.

6. The method of claim 5, wherein the measured frequency curve at the at least one seismic sensors is fitted to a measured frequency curve measured at an at least one seismic sensor of a known position.

7. The method of claim 6, further comprising: determining the position of the at least one sensor relative to the at least one sensor of known position by fitting respective measured frequency curves.

8. The method of claim 1, further comprising: determining uncertainties of the position of the at least one sensor.

9. The method of claim 1, wherein the first signal is a noise produced by an engine of a boat that carries the source.

10. The method of claim 1, further comprising:
determining the drift frequency at the at least one sensor or at a central processing device or at both the at least one sensor and the central processing device.

11. A method for determining a position of at least one seismic sensor when deployed underwater, the method comprising:
emitting a Doppler variant signal from a moving source;
recording pressures, particle velocities or particle accelerations and associated times with the at least one seismic sensor fixedly attached to the bottom of the ocean, wherein the pressures, particle velocities or particle accelerations contain the emitted Doppler variant signal modulated by the Doppler effect;
measuring a frequency drift from the recorded pressures, particle velocities or particle accelerations; and
determining a position of the at least one seismic sensor based on the measured frequency drift and a source movement relative to the at least one seismic sensor,
wherein the Doppler variant signal is one of a sine wave, a triangular wave, a rectangular wave or a combination thereof.

12. The method of claim 11, further comprising:
determining a modeled frequency drift curve based on the emitted frequency and its corresponding times, radial velocities of the moving source, and medium parameters; and
determining a measured frequency drift curve from the recorded pressures, particle velocities or particle accelerations and their corresponding times.

13. The method of claim 11, further comprising:
determining the position of the at least one sensor by best fitting the modeled frequency drift curve with the measured frequency drift.

14. The method of claim 12, wherein the measured frequency curve at the at least one seismic sensors is fitted to a measured frequency curve at an at least one seismic sensor of a known position.

15. The method of claim 14, further comprising:
determining the position of the at least one sensor relative to the at least one sensor of known position by fitting respective measured frequency curves.

16. The method of claim 11, wherein the frequency drift is estimated by comparing recordings of a sensor moving along with the source with the at least one seismic sensor.

17. A system for determining a position of at least one seismic sensor when deployed underwater, the system comprising:
a moving source configured to send a Doppler variant signal having a first frequency;
the at least one sensor configured to record pressures, particle velocities or particle accelerations and associated times, wherein the pressures, particle velocities or particle accelerations contain the Doppler variant signal modulated by Doppler effect; and
a control device configured to,
receive data from the source and from the at least one sensor to calculate a frequency drift from the recorded pressures, particle velocities or particle accelerations, and
determine a position of the at least one seismic sensor based on the calculated frequency drift and a source movement relative to the at least one sensor,
wherein the Doppler variant signal is one of a sine wave, a triangular wave, a rectangular wave or a combination thereof.

18. The system of claim 17, wherein the control device is further configured to:
determine a modeled frequency drift curve based on the emitted frequency and its corresponding times, radial velocities of the source, and medium parameters; and
determine a measured frequency drift curve from the recorded pressures, particle velocities or particle accelerations and their corresponding times.

19. The system of claim 17, wherein the control device is further configured to:
determine the position of the at least one sensor by best fitting the modeled frequency drift curve with the measured frequency drift.

* * * * *